US008683050B2

(12) United States Patent  
Ickman et al.

(10) Patent No.: US 8,683,050 B2  
(45) Date of Patent: Mar. 25, 2014

(54) DIRECTING SERVICE REQUESTS TO PROVIDERS

(75) Inventors: Steven W. Ickman, Snoqualmie, WA (US); Thomas M. Laird-McConnell, Kirkland, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/774,993

(22) Filed: May 6, 2010

(65) Prior Publication Data

US 2011/0276720 A1 Nov. 10, 2011

(51) Int. Cl.
*G06F 15/16* (2006.01)

(52) U.S. Cl.
USPC ........... 709/227; 709/203; 709/217; 709/226; 709/238; 709/245

(58) Field of Classification Search
USPC ......... 709/203, 217, 226, 227, 238, 205, 245, 709/249
See application file for complete search history.

(56) References Cited

U.S. PATENT DOCUMENTS

| | | | |
|---|---|---|---|
| 5,708,780 A * | 1/1998 | Levergood et al. ........... 709/229 |
| 5,991,292 A * | 11/1999 | Focsaneanu et al. ......... 370/352 |
| 6,338,066 B1 * | 1/2002 | Martin et al. ................. 707/708 |
| 6,760,746 B1 * | 7/2004 | Schneider ..................... 709/203 |
| 7,073,195 B2 * | 7/2006 | Brickell et al. .................... 726/5 |
| 7,093,279 B2 * | 8/2006 | Tretheway et al. ................ 726/3 |
| 7,127,500 B1 | 10/2006 | Hellman et al. |
| 7,162,436 B1 * | 1/2007 | Eckel, Jr. .................. 705/14.67 |
| 7,188,138 B1 * | 3/2007 | Schneider ..................... 709/203 |
| 7,272,639 B1 * | 9/2007 | Levergood et al. ........... 709/218 |
| 7,548,932 B2 | 6/2009 | Horvitz et al. |
| 7,565,402 B2 * | 7/2009 | Schneider ..................... 709/203 |
| 7,702,752 B2 * | 4/2010 | Kirsch et al. .................. 709/219 |
| 7,711,836 B2 * | 5/2010 | Videlov et al. ................ 709/230 |

(Continued)

FOREIGN PATENT DOCUMENTS

KR 1020080082513 A 9/2008

OTHER PUBLICATIONS

Kuhnen, et al., "Personalization-Based Optimization of Real-Time Service Delivery in a Multi-Device Environment", Retrieved at << ftp://lenst.det.unifi.it/pub/LenLar/proceedings/2009/wcnc09/DATA/T04S07P02.PDF >>, Proceedings of the 2009 IEEE conference on Wireless Communications & Networking Conference, Apr. 5-8, 2009, 6 pages.

(Continued)

*Primary Examiner* — Michael Y Won
(74) *Attorney, Agent, or Firm* — Dan Choi; Carole Boelitz; Micky Minhas

(57) ABSTRACT

A redirection service may be used to direct a user's request to specific providers of various types of services. When a user requests a web service (e.g., mapping, search, bookmarks, weather reports, etc.), the request is received by a redirection service. The redirection service identifies a provider of the service, and issues a redirect instruction to the user's browser that redirects the browser to the identified service provider. The service provider may be determined by user selection, by default, or by any other mechanism. In one example, the user's request for a service comes by selecting a link included in a web page. In another example, a user issues a direct request for the service in the form of a command. The command may be entered, in one example, through a browser or desktop search box.

20 Claims, 6 Drawing Sheets

(56) References Cited

U.S. PATENT DOCUMENTS

| | | | |
|---|---|---|---|
| 2002/0138649 A1* | 9/2002 | Cartmell et al. | 709/245 |
| 2002/0176378 A1* | 11/2002 | Hamilton et al. | 370/328 |
| 2002/0188435 A1* | 12/2002 | Labarge | 704/1 |
| 2005/0021560 A1 | 1/2005 | Yoon et al. | |
| 2006/0036748 A1* | 2/2006 | Nusbaum et al. | 709/228 |
| 2007/0143345 A1 | 6/2007 | Jones et al. | |
| 2008/0201446 A1 | 8/2008 | Svendsen | |
| 2008/0235383 A1* | 9/2008 | Schneider | 709/229 |
| 2008/0313266 A1* | 12/2008 | Barrett et al. | 709/202 |
| 2009/0198767 A1 | 8/2009 | Jakobson et al. | |
| 2009/0293018 A1 | 11/2009 | Wilson et al. | |
| 2009/0310764 A1* | 12/2009 | Gerhart | 379/142.04 |
| 2010/0136954 A1* | 6/2010 | Bennett, Jr. | 455/414.1 |
| 2010/0318657 A1* | 12/2010 | Charlson et al. | 709/226 |
| 2012/0117183 A1* | 5/2012 | Wong et al. | 709/217 |
| 2012/0262753 A1* | 10/2012 | Viccari et al. | 358/1.15 |

OTHER PUBLICATIONS

Pils, et al., "Context and Knowledge Management", Retrieved at << ftp://ftp.cordis.europa.eu/pub/ist/docs/ct/whitepaper2-context-knowledge-mgmnt-daidalos_en.pdf >>, Jun. 30, 2008, pp. 1-47.

Manouselis, et al., "Analysis and Classification of Multi-Criteria Recommender Systems", Retrieved at << http://163.17.12.2/drupal/sites/default/files/Analysis%20and%20Classification%20of%20Multi-Criteria%20Recommender%20Systems.pdf>>, World Wide Web, vol. 10, No. 4, Dec. 2007, pp. 1-27.

Gurský, et al., "UPRE: User Preference Based Search System", Retrieved at << http://nazou.fiit.stuba.sk/home/misc/uprea-wi2006.pdf >>, IEEE/WIC/ACM International Conference on Web Intelligence, WI, Dec. 18-22, 2006, 7 pages.

Spaccapietra, et al., "Somebody, Sometime, Somewhere, Something", Retrieved at << http://lbdwww.epfl.ch/~yu/files/udm-final.pdf >>, UDM Proceedings of the International Workshop on Ubiquitous Data Management, Apr. 4, 2005, 8 pages.

Rousseau, et al., "User Profiling for Content Personalization in Information Retrieval", Retrieved at << http://www.irisa.fr/texmex/publications/versionElect/2004/Rousseau_ACMSAC04_UserProfile.pdf >>, 19th ACM Symposium on Applied Computing, SAC, Mar. 2004, 8 pages.

"Bownser Demos", Retrieved at << http://www.bownser.com/demos.html >>, retrieved on May 6, 2010 (document undated), pp. 1-3.

"Bownser", Retrieved at << http://api.bownser.conn/invoke.aspx?v=map&t=adr&street=one+microsoft+way&locality=redmond&region=wa >>, dated 2007, 1 page.

"User help", Retrieved at << http://api.bownser.com/api/help.aspx >>, dated 2007, 1 page.

"Bownser—select a service", Screen Shot of << http://api.bownser.com/invoke.aspx?q=w+98033 >>, dated 2007, 1 page.

International Search Report and Written Opinion Received of the International Searching Authority for PCT Application No. PCT/US2011/034257, mailed on Oct. 19, 2011, 10 pages.

* cited by examiner

DIRECTING SERVICE REQUESTS TO PROVIDERS

BACKGROUND

Many different types of services are available on the web. Examples of services include mapping service, weather services, bookmark services, search engines, and other types of services. In some cases, these services are accessed directly by a user, as in the case where a user explicitly navigates to the site of a mapping service to get a map or directions. In other cases, the services are used by other web sites, as in the case where a restaurant's web site contains a link to a mapping service in order to show the restaurant's location.

Many services have similar functions, and users sometimes favor one service over another. For example, one user might like to view maps on the BING service, while another user might choose to view maps on a different map service. Similarly, users might have opinions about particular weather services, bookmark services, search engines, etc.

When a web site links to a service, the service provider is chosen by whomever creates content for the referring web site. For example, when a restaurant's web site contains a link to a mapping service in order to show the restaurant's location, the link normally points to a particular mapping service. The choice of mapping service is generally an editorial decision of the content-creator of the referring web site. This choice is normally made without regard to which service a particular user would like to use.

SUMMARY

The use of web services may be formulated in an abstract way, so that a request for service can be specified without reference to a particular service provider. A redirection service may be operated that redirects these abstract requests to particular service providers. For example, an abstract request for a map of a particular zip code could be received by the redirection service. The redirection service then could redirect the request to a particular mapping service chosen by the user who issued the request. A map of that zip code would then be presented by whichever map service the user favors. Similar redirection could be made for weather requests, bookmark requests, search queries, etc.

In one example, the first time a particular user's request is directed to the redirection service, the service asks the user to choose a service provider. For example, if the redirection service has not yet seen a map request from a particular user, the redirection service could ask the user to choose from among various different mapping services. In the future, the redirection service could remember the user's choice, so that the user would not have to be asked to make a selection again. The user could be recognized based on a data string that is transmitted from the user's machine with the user's permission. (E.g., a cookie could be set the first time a given machine contacts the redirection service, and the cookie could be transmitted to the service at the time of subsequent contacts—all in observance of the cookie policy that the user has specified). The recognition of the user can thus be done in a way that respects the user's privacy, and without using any personally identifiable information.

The redirection service may translate abstract requests in various ways. For example, an abstract request for a map may identify a geographic region by zip code, but a particular mapping service might accept only latitude and longitude coordinates. Thus, the redirection service might translate a zip code into the latitude and longitude of the central point of the geographic region that the zip code encompasses.

In one example, the redirection service can act as an aggregator of various types of services that a user might request. For example, a user could register his choices for search provider, map provider, weather provider, etc., and could then set the redirection service as his browser's default search provider. In the browser's search box, a command like "m 98052" could be issued, which could then generate a redirection to the user's chosen mapping service to retrieve a map of the zip code 98052. Similarly, commands like "s travel" or "w seattle" could be issued to do a search on the word "travel", or to find a weather report for Seattle, respectively. The redirection service could then redirect these requests to the user's chosen search engine or weather service. In addition to issuing these kinds of commands from a browser search box, the ability to redirect could be built into a desktop search box, thereby allowing a user to access arbitrary services as part of a desktop search function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
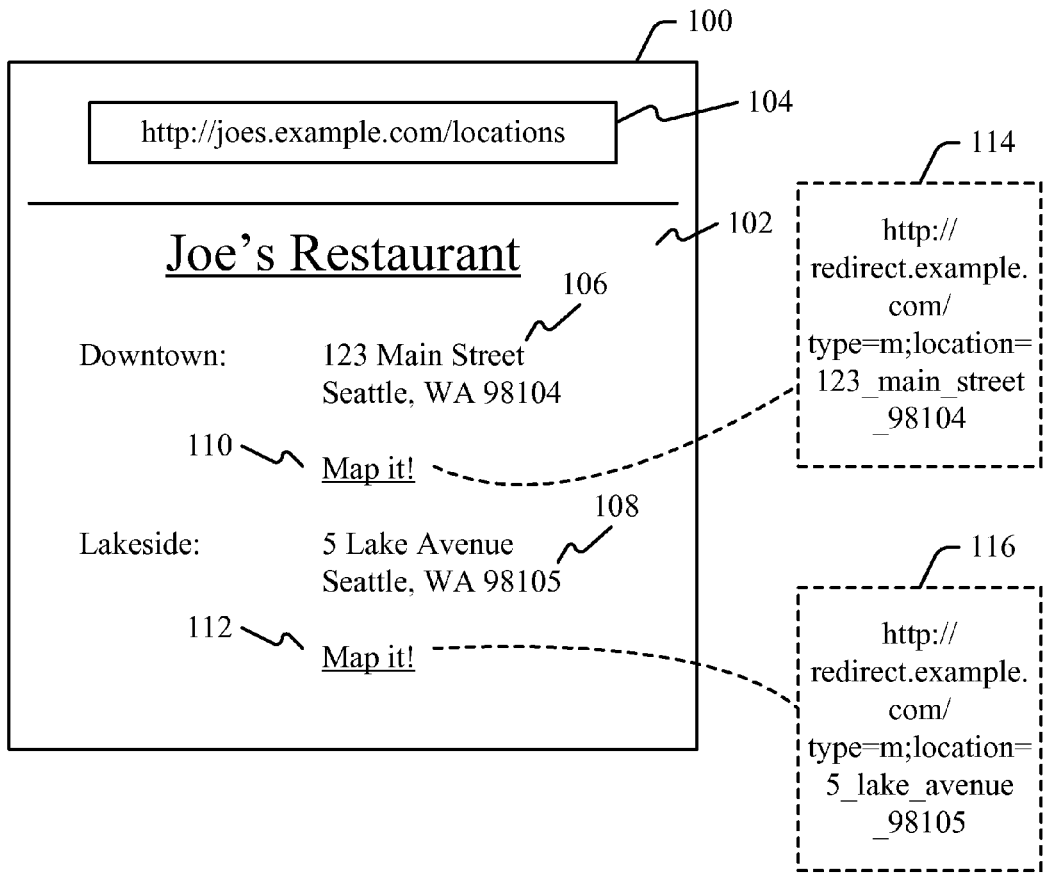
FIG. 1 is a block diagram of an example web page that may make use of a redirection service.

Various different types of services exist on the web. Search engines, mapping services, weather services, and bookmark services are a few examples of the types of services that exist, although many other types of services exist as well. Sometimes users access these services directly, e.g., by visiting the web site of a particular mapping service. However, in many cases, these services are pointed to by other web sites. For example, a business such as a restaurant might want to provide a map of its location on its web site. Thus, the business's web site may contain a link to a map on a particular mapping service. Or, a vacation resort's web site might link to a weather service, so that visitors to the web site can see the current weather at the resort.

In many cases, the particular service provider that one uses is a matter of taste. One user might favor one search engine (or weather service, or mapping service, etc.), while another user favors a different search engine (or weather service, or mapping service, etc.). However, when a web site contains a link to a service, the particular service that the web site links to is normally chosen by the person or entity that creates the referring web site's content. That is, if a restaurant's web site contains a link to a map, that link points to the particular mapping service chosen by the creator of the web site. This mapping service, however, might not be the same one the user would have chosen.

The subject matter herein allows for a level of abstraction in requesting a service. A request for a particular type of service (such as search, mapping, weather, etc.), may be specified as a link to a redirection service. The redirection service may solicit the user's choice of service provider for the type of service requested, or may look up a previously-specified choice of service provider. The redirection service may then redirect the user's browser to the particular service provider that the user has chosen. The request may be reformulated to accommodate the format constraints of the chosen service provider—e.g., a mapping request that is specified by zip code might be converted to latitude and longitude, if the chosen mapping service only accepts latitude and longitude specifications.

The first time that a given user requests a particular kind of service through the redirection service, the redirection service may ask the user which service provider he or she would like to use. For example, if a particular user has not previously requested a map through the redirection service, then the redirection service may give the user a choice of several map providers and may ask the user to select one of them. The user's request is then redirected to the chosen map provider, and the user's choice may be stored by the redirection service. Then, if the same user requests a map in the future, the user's prior choice of map provider may be retrieved, and the request may be directed to the chosen map provider without having to ask again for the user's choice of map provider. The user's choice of search provider, weather provider, bookmark provider, etc., could be solicited and remembered in a similar way. (The user's choices may be associated with a particular user in a way that respects the user's privacy, and that does not identify the user personally. For example, in accordance with the user's chosen cookie policy, a cookie that does not personally identify the user could be set on the user's machine at the time of initial contact, and the value of the cookie could be transmitted to the redirection service during future contacts between the redirection service and that machine.)

One example way to use the redirection service is for web content creators to adopt the redirection service as a way to link to popular types of service. For example, when a web content creator want to include links to a map in its web site, instead of including a link to the BING map service, the content creator could include a link to the redirection service, where the link indicates that it is a map request. The redirection service could then redirect the request to a particular mapping service, in accordance with whatever choice the user has made. (A format for such links could be created, and could be made publicly known so that content creators could include requests for particular types of service in a known format.)

In another example, a user could make more explicit use of the redirection service. Thus, a user could set his or her browser to use the redirection service as the browser's default search provider, and could then issue various types of commands through the browser's search box. For example, a language could be created in which "s" stands for "search", "m" stands for "map", "w" stands for "weather", etc. When phrases such as "w seattle" are entered in the search box, these strings could be passed to the redirection service, which would then redirect the request to the appropriate search provider depending on what letter (or other string) precedes the request. Thus, if the user has selected the BING search engine as the search provider that the user would like the redirection service to use, then upon receiving a string such as "s travel", the redirection service could redirect the user's browser to the BING search engine with the query string "travel." Similarly, the same redirection service could receive a string such as "m 98052" and could then redirect the browser to a mapping service with a request to show a map of the geographic region that corresponds to the zip code 98052 (which is Redmond, Wash.). In this sense, the browser's search box could become a type of aggregator for a wide variety of commonly-used services. Moreover, these types of instructions could be incorporated into a desktop search box (e.g., a search box that is provided by a computer's operating system as part of the desktop user interface), thereby allowing a number of online services to be offered through the user interface of a computer (or mobile phone, or music player, etc.). A one-letter command that precedes some parameters is merely an example of how such commands could be issued. In greater generality, any type of command (e.g., "weather 98052") could be issued, or the redirection service could have natural language processing capability and could understand sentences or natural language fragments like "Seattle weather," "weather in Seattle," etc.

Additionally, a redirection service could provide various economic opportunities. For example, different search providers might enter into a commercial transaction with the redirection service in order to become the default provider of a particular type of service. For example, a map provider might pay to become the default provider of maps, so the redirection service would, by default, direct new users to that mapping service until a user takes action to select a different provider. Or, the redirection service could be used to collect data about how popular the various services are (and may include a data collection component that is used to collect statistics regarding what service providers users tend to choose, and how these service providers are used). This type of bulk data about overall usage patterns can be collected without associating any particular user with his or her choice, and thus data collection can be implemented in a way that respects individual users' privacy.

Turning now to the drawings, FIG. 1 shows an example web page that may make use of a redirection service. In the example of FIG. 1, a web page is shown that uses a redirection service to direct a user to a mapping service. However, it will be understood that a web page could use a redirection service to direct a user to any type of service (e.g., weather, bookmark, search engine, etc.).

In FIG. 1, browser 100 displays a web page 102. Web page 102, in this example, is the web page for a restaurant named "Joe's Restaurant," and is identified by the Uniform Resource Locator (URL) "http://joes.example.com/locations" (which appears in the navigation bar 104 of browser 100). Web page 102 contains the various locations of Joe's Restaurant. In this example, one location is in downtown Seattle, and another location is by the lake. Web page 102 shows the addresses 106 and 108 for these two locations, respectively. Additionally, for both addresses, web page 102 contains "map it" links 110 and 112, which allow users to obtain maps of the areas surrounding the restaurant's two different locations.

As noted above, some web pages that provide maps contain links to specific mapping services. However, web page 102 contains links to a redirection service, with a specification that the particular service being requested is a map. Thus, link 110 points to "http://redirect.example.com" (where, in this example, "redirect.example.com" is the domain name of a redirection service). The URL also contains the string "/type=m; location=123_main_street_98104". This string indicates the particular type of request ("m" for map), and also indicates the location for which a map is being requested. Similarly, link 112 points to "http://redirect.example.com", and contains information representing the Lakeside location of Joe's Restaurant.

In this example, the URLs 114 and 116 in links 110 and 112, respectively, represent abstract links to a mapping service, which are expressed in one possible format. That is, the redirection service located at "redirect.example.com" might publish a specific format in which a request has a "type=" string, followed by some parameters. Request types such as "m" for map, "w" for weather, "s" for search, etc., might be recognized. Moreover, the specific types of requests might have certain types of parameters or arguments that could be specified. For example, map and weather requests might take a "location" parameter (which indicates the location for which a map or a weather report is sought), while search requests might take a "query" parameter (which represents an arbitrary text string to be passed to a search engine). The format shown in FIG. 1 represents one type of format for forming an abstract request, although any appropriate format could be used.

Thus, if the user clicks link 110 or link 112, the user navigates to the redirection service located at "redirect.example.com". That redirection service may respond in the manner described below.

In a sense, a request may be said to comprise an indication of a type of service that is being sought, and a set of zero or more arguments that describe the information that is being sought from the service. Thus, in a mapping request, a the type of the request might be indicated by the letter "m", the zip code of the region for which the map is sought can be viewed as a description of the region for which a map is sought. Or, as another example, a search request might be indicated by the type indicator "s", and the search query might be viewed as being a description of the search results that are being sought from a search engine.

Figure 2:
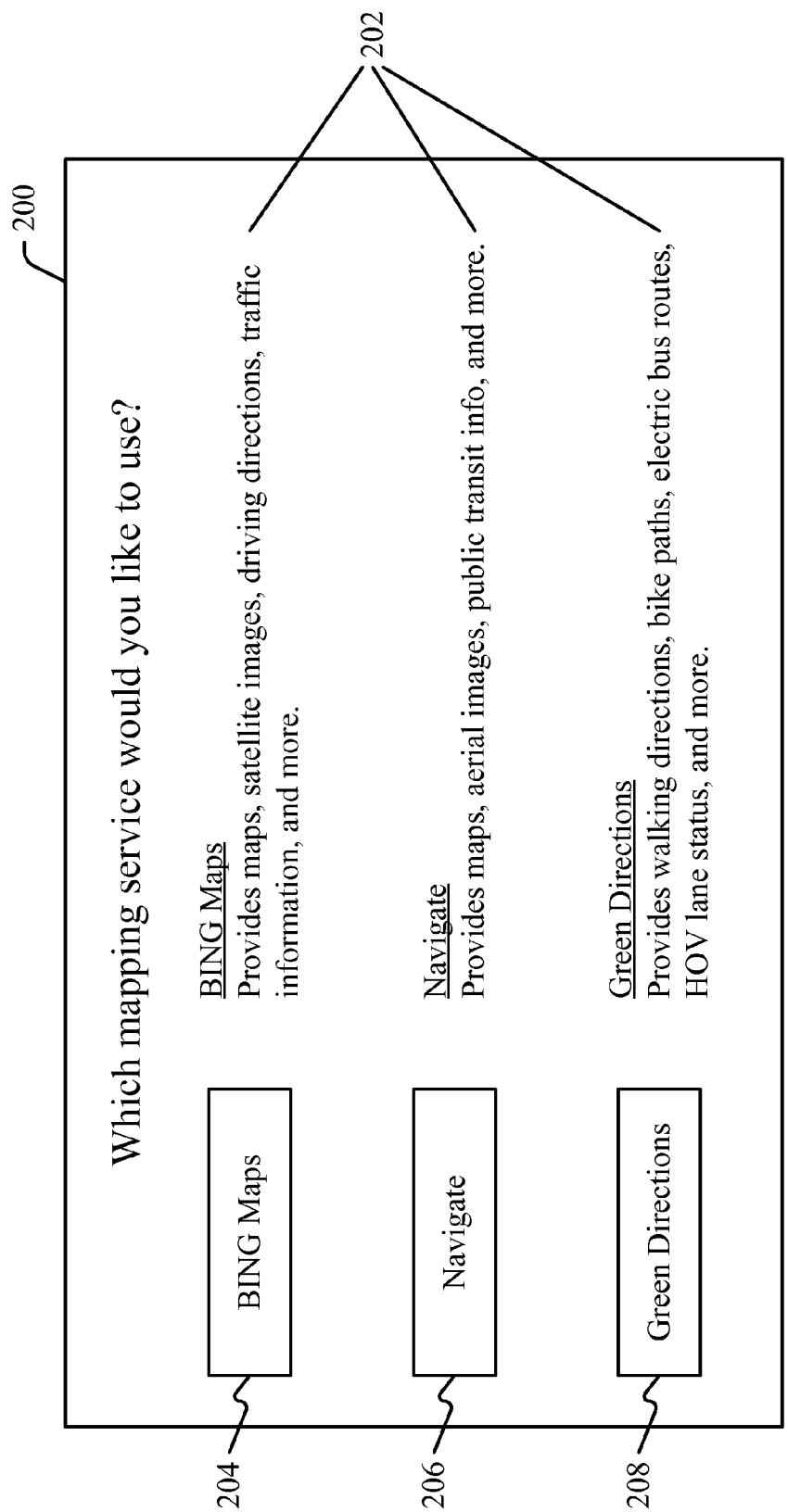
FIG. 2 is a block diagram of an example user interface that offers a user a choice of service providers.

The first time that a user requests a particular type of service through the redirection service, the user may be presented with a choice of different service providers. An example of how this choice may be presented is shown in FIG. 2.

User interface 200 may be used, by a redirection service, to offer a user a choice of different service providers. In the example of FIG. 2, user interface 200 offers a choice of mapping service providers, although a similar user interface could be used to offer a choice of any type of provider (e.g., search engine, bookmark service, etc.). Typically, a redirection service supports a finite set of service providers for a given type of service, and thus user interface 200 may offer a user a choice from among this finite set of providers. User interface 200, in this example, offers a choice of three mapping providers: the BING mapping service, and services called "Navigate" and "Green Directions." As can be seen from the descriptions 202 accompanying each service, all of the services provide maps, but each service offers a particular perspective on the task of providing maps. The BING service, in this example, is a general map service that provides all types of maps and directions. The "Navigate" service provides maps and directions, with some emphasis on providing directions by public transit. The "Green Directions" service provides maps and directions with a focus on environmentally-friendly travel. These differences may give rise to a user choosing one service over the other based on the user's tastes.

Thus, if a user wants to choose the BING mapping service as his or her default map provider, the user can click button 204 when presented with user interface 200. Similarly, if the user wants to choose "Navigate" or "Green Directions" as his or her default map provider, the user can click button 206 or button 208, respectively. When the user has made a choice, the user's choice may be stored by redirection service, and may be saved for when the same user requests maps in the future. In one example, the redirection service may have a database in which it associates a particular machine with particular service. As noted above, an anonymous string may be associated with a machine (where the string may be set as a cookie the first time a given machine makes contact with the redirection service), so that a particular machine can be recognized each time it makes contact with the redirection service. Thus, a database that associates this string with a particular set of service providers may be stored and accessed by the redirection service.

Figure 3:
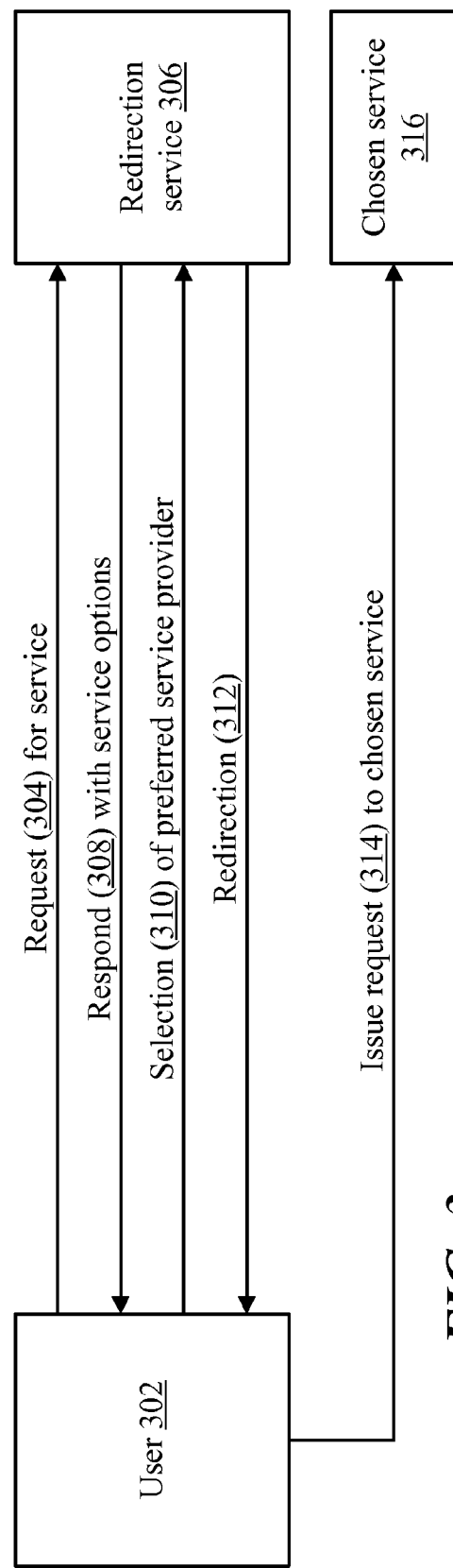
FIGS. 3 and 4 are flow diagrams of example workflows that may be performed when a user requests, through a redirection service, a particular kind of service.
Figure 4:
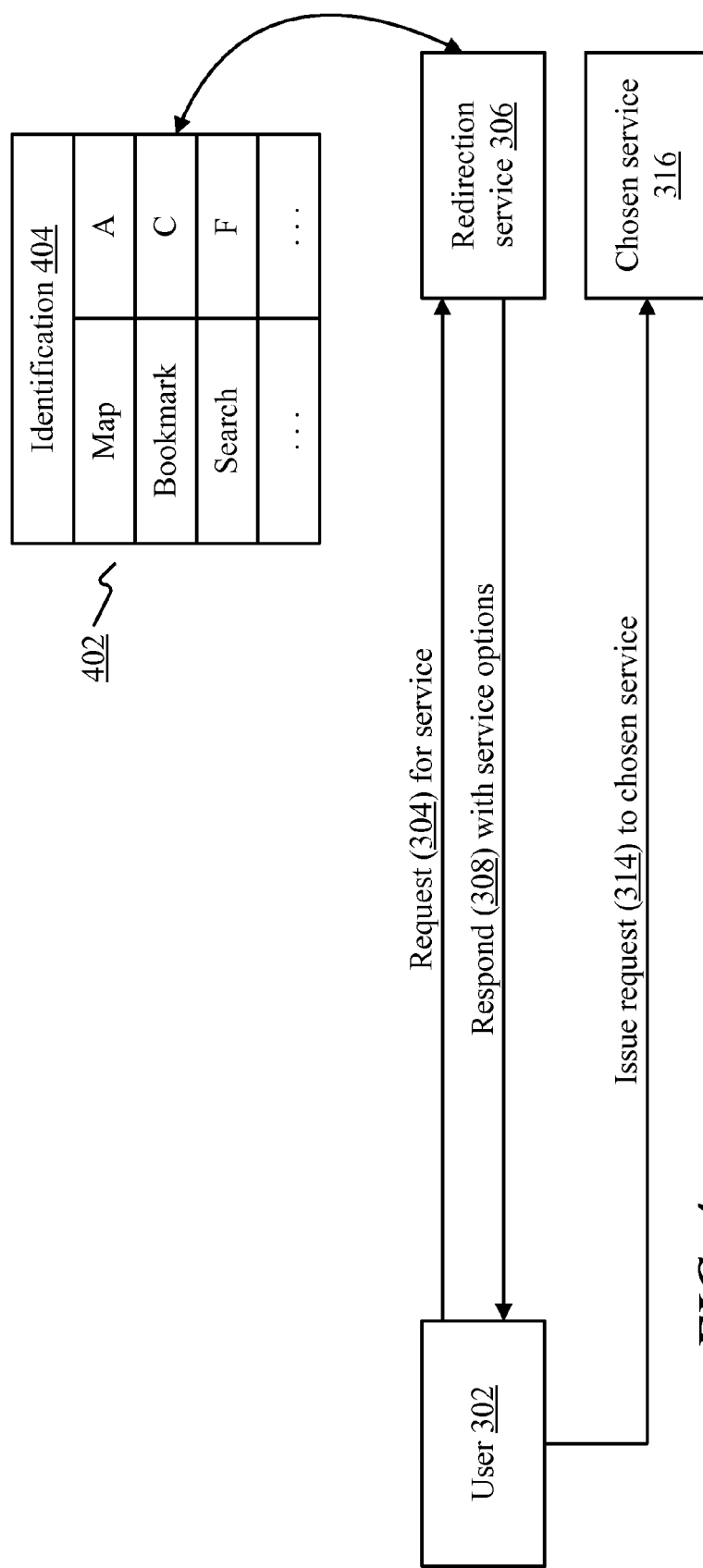

As noted above, a user's interaction with a redirection service may be different depending on whether he or she is requesting a particular service for the first time, or at some later time. E.g., the first time that the user requests any particular kind of service (e.g., map, search, bookmark, etc.) through the redirection service, the user may be shown an interface (such as user interface 200, shown in FIG. 2) in order to select a particular provider of that kind of service. Thus, FIGS. 3 and 4 show two different example workflows for the various different circumstances. In particular, FIG. 3 shows an example workflow that may occur when a user requests a particular kind of service from the redirection service for the first time. And FIG. 4 shows an example workflow that may occur when a user requests, through a redirection service, a kind of service for which a service provider has already been designated. It is noted that the workflow of FIG. 4 may occur when the user has previously selected a service provider for a particular type of service, but may also occur when such a service provider has been selected for the user (e.g., in the case where a service provider for a given type of service has been selected for the user by default).

Turning now to FIG. 3, user 302 issues a request 304 for a particular kind of service. This request may arise in various ways. For example, as shown in FIG. 1 and discussed above, a web page may contain a link to request a particular kind of service (such as asking for a map of a particular location), and that link may request the service through a redirection service. Or, as noted above, a user might explicitly request a service through a redirection service, as in the case where the user types a command such as "m 98052" into a browser search box or desktop search box in order to obtain a map of a particular zip code.

Regardless of how the user's request 304 arises, request 304 may be received by redirection service 306. Redirection service 306 may, for example, be software that is implemented on a server machine (or cluster of server machines), that is (are) connected to the internet. In the example workflow of FIG. 3, redirection service 306 does not have a record of a particular service provider who is to provide the type of service that user 302 is requesting. For example, it might be the case that user 302 has not yet requested that particular kind of service from redirection service 306. Or, user 302 might have requested such service, but from a different machine of which redirection service 306 has no record. Or, redirection service 306 might have had a record of user 302's choice of service provider in the past, but that record might have been deleted for some reason (e.g., due to a long period of inactivity on the part of user 302). Thus, in FIG. 3, it is presumed that redirection service 306 has made a determination to ask user 302 which service provider user 302 would like to use for the kind of service that has been requested. However, the scenario in FIG. 3 is not limited to any particular reason for which this determination may have been made. Thus, redirection service 306 responds (308) with a list of service provider options.

Based on the options provided, user 302 selects (310) a service provider who will provide the type of service requested. Thus, if request 304 is a request to obtain a map, then user 302 might have been shown the options depicted in FIG. 2, and user 302 might select one of those options. At that point, redirection service 306 may record user 302's choice for future use, so that redirection service 306 can direct user 302's future mapping requests to the selected service without having to ask user 302 to choose a service again. Additionally, once user 302's selection of a service provider is made, redirection service 306 communicates a redirection instruction 312 to user 302's browser, thereby causing user 302's browser to issue a request 314 to user 302's chosen service 316. For example, if the request is for a map of the zip code 98052 and the user's selected map service is located at "maps.example.com", then redirection service 306 might redirect user 302's browser to the URL "http://maps.example.com/zip=98052", thereby causing the browser to request that URL and to obtain the requested map. Redirection service 306 might reformulate request 304 in some manner. For example, as noted above, if request 304 specifies a map of a particular zip code but the user's chosen map service is only able to receive latitude/longitude requests, then redirection service 306 might reformulate the request with the latitude and longitude of the location for which a map is requested, thereby generating a URL such as "http://maps.example.com/lat=47.669444; long=−122.123889". In this example, a zip code and a latitude/longitude pair are two distinct ways of indicating a particular service to be provided (where the "service to be provided," in this example, is displaying a map of Redmond, Wash.). (Thus, in general, it can be said that a request that contains a first indication of a service to be provided may be reformulated into a request that contains a second indication of that service, where the second indication comprises, or is derived from, the first indication.)

FIG. 4 shows an example workflow in which the choice of provider for a particular type of service has already been made for a particular user. This situation might occur, for example, if the user has already selected a particular service provide (e.g., using the workflow of FIG. 3). However, this situation might also arise in other circumstances, such as where a default service provider is used until the user takes action to make a change. (E.g., a particular map provider, such as the Green Directions provider of FIG. 2, might have paid a redirection service to be the default map provider until a user takes action to change to a different map provider.)

Thus, in FIG. 4, user 302 issues request 304 for a particular service (e.g., a mapping service), and request 304 is received by redirection service 306. Redirection service 306 may look up record 402 pertaining to user 302. Record 402 may be stored in a database. Record 402 may contain an identifier 404 of user 302's machine. (As noted above, identifier 404 may be an anonymous identifier in order to respect user 302's privacy.) Identifier 404 may, for example, be the value of a cookie that was set the first time that user 302's machine contacted redirection service 306, and the value of this cookie may be obtained when request 304 is issued to redirection service 306. Record 402 may contain various service provider choices that are to be used when the machine associated with identifier 404 requests a service. For example, record 402 indicates that, when a request associated with identifier 404 is received, map requests are to be served by map service A, bookmark requests are to be served by bookmark service C, search requests are to be served by search service F, and so on. Record 402 may contain choice for any type of service provider, in addition to the specific map, bookmark, and search examples shown.

Once the particular service provider to be used has been identified, redirection service 306 issues redirection instruction 312, which instructs user 302's browser to redirect to a particular service. Since a decision has already been made as to which service provider will provide the service (e.g., as a result of the user's prior selection, or as a result of a default provider having been selected, or with the provider having been selected for some other reason), a redirection instruction can be issued without having to ask the user to select a service provider. Thus, in the map example above, redirection instruction 312 might instruct user 302's browser to navigate to "http://maps.example.com/zip=98052". Based on redirection instruction 312, user 302's browser issues a request 314 to the chosen service 316 (e.g., to the particular mapping service identified by record 402).

Figure 5:
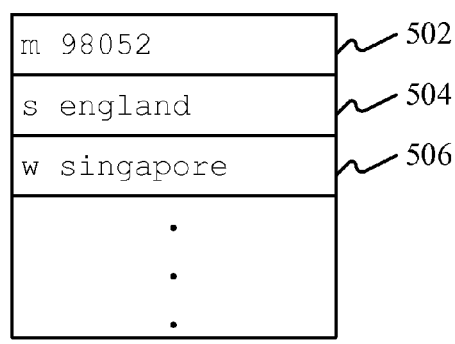
FIG. 5 is a block diagram of some example commands that could be used to request services.

As noted above, a redirection service could implement a kind of language in which a user could request various types of services through simple commands. FIG. 5 shows examples of some types of commands that could be used to request services. Command 502 is an example command to request a map. Command 504 is an example command to request a search. Command 506 is an example command to request the weather. FIG. 5 shows an example command language in which each type of request is indicating by a single letter preceding a string. However, any type of format could be used for commands. In the example shown, command 502 request a map of the zip code 98052, command 504 request a search on the text query "england", and command 506 requests the weather in Singapore. These commands request services from appropriate types of service provides (a mapping service, a search engine, and a weather service, in this example). Other commands could be created for other types of services—e.g., "b" for bookmark, "wiki" for Wikipedia, "bl" for posting on a blog, etc. Or, as mentioned above, commands might be full words (e.g., "weather" instead of "w"), or a redirection service could have the capability to recognize natural language sentences or fragments, such as "Seattle weather."

Figure 6:
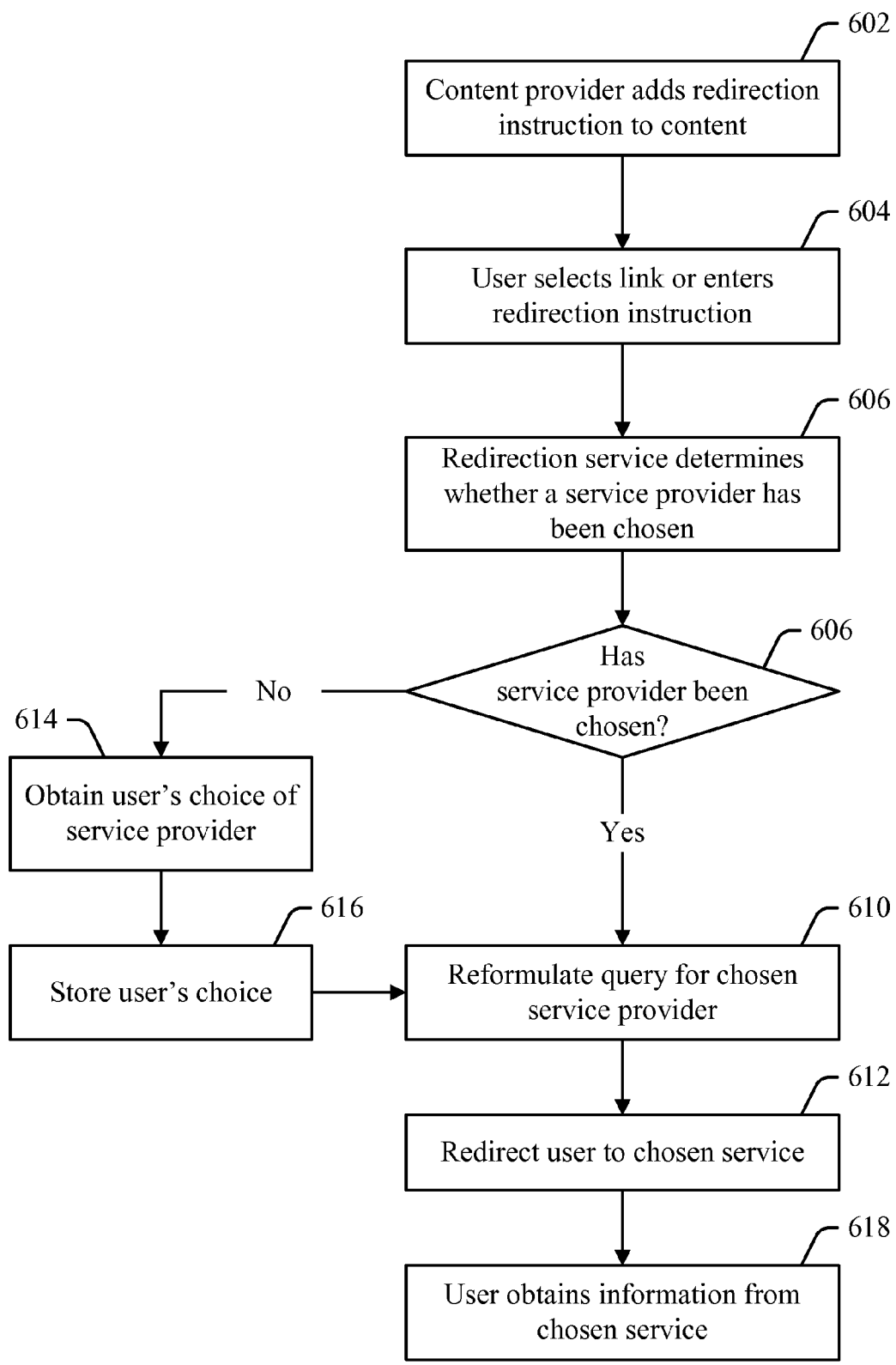
FIG. 6 is a flow diagram of an example process in which a redirection service may be used to direct a user's request to a service provider.

FIG. 6 shows an example process in which a redirection service may be used to direct a user's request to a service provider. At 602, a content provider may add a redirection link to content. For example, in FIG. 1, the creator of the web site for "Joe's Restaurant" includes, on that web site, links to a redirection service, where the links are used to request maps of the various locations of the restaurant. Thus, FIG. 1 provides one example of a redirection link that may be included in content, although it is noted that any type of redirection link requesting any type of service may be included in content, and the subject matter herein is not limited to mapping services. Moreover, it is noted that 602 is optional, since a redirection service may be used in other ways. Some of these other ways (e.g., invoking the redirection service by issuing a command such as "m 98052" through a browser or desktop search box) do not involve including a link to the redirection service in web content.

At 604, the user selects the redirection link in the content, or otherwise enters an instruction that invokes the redirection service. As noted above, when a link to the redirection service is included in content (e.g., the mapping link the Joe's Restaurant example), clicking this link is an example of an instruction to invoke a redirection service. However, other types of instructions (e.g., giving an instruction through the browser or desktop search box) may be used to invoke the redirection service.

The redirection service may then determine the type service to which the request relates. For example, the request may contain a code indicating a particular type of service, or may contain a text string to indicate a type of service (as shown in FIG. 5 and described above). At 606, the redirection service determines whether a service provider has been chosen for the type of service requested. Thus, in one example, if the instruction to invoke the redirection service includes a request for a map, it is determined whether a mapping service provider has been chosen. If a service provider has already been chosen (at 608), then the redirection service may reformulate the query in the manner expected by the chosen service provider (at 610) (e.g., the redirection service might convert a zip code location to a latitude/longitude location). Then, the redirection service redirects the user to the web site of the chosen service (at 612), as described above.

If a service provider has not already been chosen, then the redirection service obtains the user's choice of service provider for the requested service (at 614) (e.g., by sending, to the user's machine, instructions to display the user interface of FIG. 2). Then, the user's choice may be stored (at 616), so that that the choice can be used in the event that the user later contacts the redirection service with a request for the same type of service. The process then continues to 610, and proceeds as described above.

After the user has been redirected to the chosen service provider, the user obtains information from the chosen service provider (at 618). The information may be a map, search results, a weather report, or any other type of information that could be provided by a service provider.

It is noted that FIG. 6 refers to obtaining service from the user's chosen service provider. However, service could also be obtained from a service provider that has not been chosen. For example, as noted above, a redirection service might offer various default service providers, and may then allow users to change from the default to a different provider. Thus, the flow diagram of FIG. 6 also applies to the case where the user receives service from a non-chosen service provider, such as a default provider.

Figure 7:
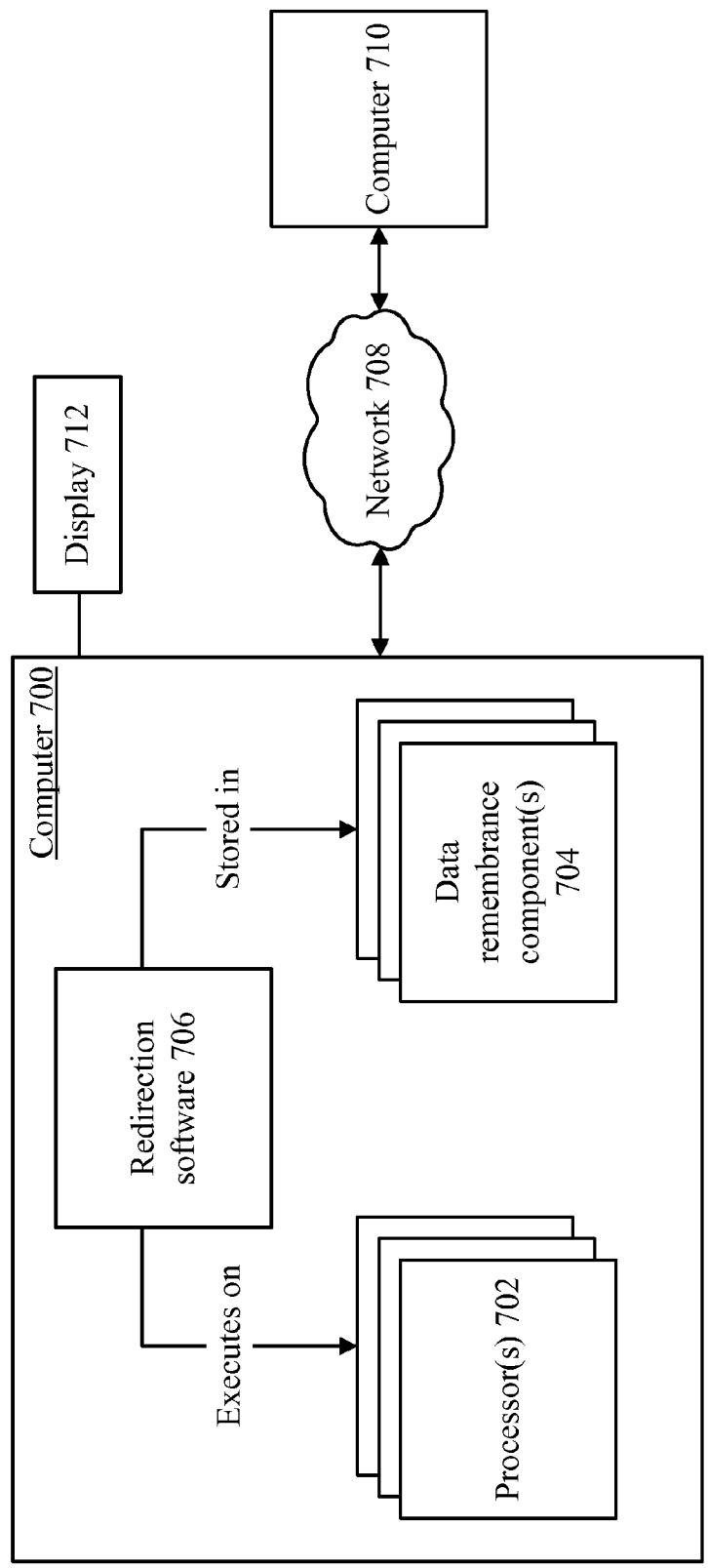
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is redirection software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to have a first request served by a service provider, wherein the executable instructions, when executed by a computer, cause the computer to perform acts comprising:
   receiving the first request from a user;
   determining a type of service to which the first request relates;
   identifying a service provider that provides said type of service for said user, said first request comprising a first text string that identifies said type of service and a second text string that describes information to be provided by said service provider, there being a choice of plural providers that can provide said type of service identified by said first text string, there being one specific type of service associated with said first text string;
   converting said first request into a second request, wherein said second request is in a format accepted by said service provider; and
   communicating, to a machine associated with said user, a redirection instruction that instructs said machine to issue said second request to a site associated with said service provider.

2. The one or more computer-readable storage devices of claim 1, wherein said type of service comprises mapping, and wherein said service provider provides maps and directions.

3. The one or more computer-readable storage devices of claim 2, wherein said first request comprises a first indication of a location for which a map is to be provided, and wherein said converting of said first request into said second request comprises:
creating a URL that identifies said service provider; and
including, in said URL, a second indication of said location that is distinct from said first indication.

4. The one or more computer-readable storage devices of claim 1, wherein said type of service comprises a search, and wherein said service provider comprises a search engine that provides results in response to a query that is in said first request.

5. The one or more computer-readable storage devices of claim 1, wherein said identifying of said service provider comprises:
determining that said user has not previously identified a service provider for said type of service;
sending, to said machine, a third request that said user select a provider for said type of service; and
receiving said user's selection in response to said third request.

6. The one or more computer-readable storage devices of claim 1, further comprising:
determining that said machine has not yet contacted a redirection service that performs said acts; and
setting a cookie on said machine that allows said redirection service to recognize said machine upon future contacts from said machine.

7. The one or more computer-readable storage devices of claim 1, wherein said identifying of a service provider that provides said type of service for said user comprises:
identifying a default provider of said type of service;
determining that said user has not selected a service provider for said type of service; and
based on determining that said user has not selected a service provider for said type of service, using said default provider as said service provider.

8. A method of responding to a service request, the method comprising:
using a processor to perform acts comprising:
receiving the service request from a machine associated with a user, wherein the service request comprises a first indication of a service to be provided;
determining a type of service that is requested by said service request;
identifying a service provider that responds to requests, from said user, for said type of service, said first indication comprising a first text string that identifies said type of service and a second text string that describes information to be provided by said service provider, there being a choice of plural providers that can provide said type of service identified by said first text string, there being one specific type of service associated with said first text string;
creating a Uniform Resource Locator (URL) that comprises:
a domain of said service provider; and
a second indication of said service to be provided, wherein said second indication comprises, or is derived, from said first indication; and
sending, to said machine, a redirection instruction to redirect a browser on said machine to said URL.

9. The method of claim 8, wherein said type of service comprises a bookmark service, and wherein said service provider allows said user to bookmark web pages.

10. The method of claim 8, wherein said type of service comprises a weather service, and wherein said service provider provides weather reports for a region specified by said first indication.

11. The method of claim 8, wherein said service request comprises said first text string and said second text string entered through a search box of said browser, wherein a redirection service performs said acts, and wherein said browser is set to use said redirection service as a default search provider.

12. The method of claim 8, wherein said service request comprises said first text string and said second text string entered through a desktop search box provided by an operating system on said machine, wherein said text command comprises a first string that identifies said type of service and one or more second strings that describe information to be provided by said service provider.

13. The method of claim 8, further comprising:
entering into a commercial transaction with said service provider to make said service provider a default provider of said type of service;
and wherein said identifying comprises:
determining that said user has not previously chosen a provider for said type of service; and
based on said user's not having previously chosen a provider for said type of service, using said default provider as said service provider.

14. A system for responding to service requests, the system comprising:
a processor;
a data remembrance component; and
a redirection component that is stored in said data remembrance component and that executes on said processor, wherein said redirection component receives, from a machine associated with a user, first information that comprises:
an indication of a type of service to be provided; and
an argument that describes second information that is being requested through said type of service;
wherein said redirection component identifies a service provider that provides said type of service for said user, wherein said redirection component creates a Uniform Resource Locator (URL) that requests said second information from said service provider, and wherein said redirection component communicates, to said machine through a network, an instruction for a browser on said machine to redirect to said URL, said indication comprising a first text string that identifies said type of service, said argument comprising a second text string that describes information to be provided by said service provider, there being a choice of plural providers that can provide said type of service identified by said first text string, there being one specific type of service associated with said first text string.

15. The system of claim 14, further comprising:
a database that stores users' selections of service providers for types of service;
wherein said redirection component looks up, in said database, said user's choice of provider for said type of service, and uses said user's choice in creating said URL.

16. The system of claim 14, wherein said redirection component determines that said user has not chosen a provider for said type of service, and sends, to said machine, a user interface that requests that said user choose a provider for said type of service, wherein said user interface comprises a finite set of providers of said type of service that are supported by said redirection component.

17. The system of claim 14 said first text string and said second text string being entered through a search box of said browser or through a desktop search box that is provided by a desktop of said machine.

18. The system of claim 14, wherein said redirection component determines that said machine has not previously used said redirection component to request any service, and wherein said redirection component sets a cookie on said machine to allow said machine to be recognized upon future contacts with said redirection component.

19. The system of claim 14, wherein said redirection component determines that said user has not previously selected a provider for said type of service, and wherein said redirection component identifies a default provider as said service provider.

20. The system of claim 14, further comprising:
   a data collection component that collects statistics regarding uses of, and choices of, service providers.

* * * * *